United States Patent
Kuhl et al.

(10) Patent No.: US 9,094,529 B2
(45) Date of Patent: Jul. 28, 2015

(54) CONSISTENT USER INTERFACE FOR MULTI-MODE MOBILE TERMINALS

(75) Inventors: Lawrence Edward Kuhl, Waterloo (CA); Asif Hossain, Kanata (CA)

(73) Assignee: BlackBerry Limited, Waterloo (CA)

( * ) Notice: Subject to any disclaimer, the term of this patent is extended or adjusted under 35 U.S.C. 154(b) by 1756 days.

(21) Appl. No.: 11/687,275

(22) Filed: Mar. 16, 2007

(65) Prior Publication Data

US 2008/0227483 A1    Sep. 18, 2008

(51) Int. Cl.
*H04W 88/06* (2009.01)
*H04M 1/725* (2006.01)
*H04W 4/06* (2009.01)
*H04W 4/16* (2009.01)

(52) U.S. Cl.
CPC ...... *H04M 1/72519* (2013.01); *H04M 2250/62* (2013.01); *H04W 4/06* (2013.01); *H04W 4/16* (2013.01); *H04W 88/06* (2013.01)

(58) Field of Classification Search
CPC ....... H03M 1/005; H04B 1/006; H04B 1/406; H04B 1/0064; H04L 63/08; H04W 36/14
USPC ............. 455/552.1, 552.3, 567, 127.4, 556.1, 455/551, 416
See application file for complete search history.

(56) References Cited

U.S. PATENT DOCUMENTS

| | | | |
|---|---|---|---|
| 6,104,924 A | | 8/2000 | Shirai |
| 6,118,864 A | * | 9/2000 | Chang et al. ................. 379/225 |
| 6,198,942 B1 | | 3/2001 | Hayashi et al. |
| 2002/0132636 A1 | * | 9/2002 | Stockhusen ................... 455/553 |
| 2003/0040340 A1 | * | 2/2003 | Smethers ...................... 455/566 |
| 2005/0021868 A1 | * | 1/2005 | Sharma et al. ................ 709/249 |
| 2006/0205432 A1 | * | 9/2006 | Hawkins et al. ........... 455/552.1 |

FOREIGN PATENT DOCUMENTS

JP    11308308    11/1999

OTHER PUBLICATIONS

SCH-A795 Series Portable Tri/Dual—Mode Telephone User Guide, Samsung Telecommunications America, Inc., 2005.
Samsung SCH-A790, Cell Phones, CNET Reviews, CNET Networks Inc., 2004.
User's Guide, Mobile Phone A1228C, Ericsson Inc., 2000.
SCH-i830 Series, Global Quadband Pocket PC Phone, User Guide, Samsung Telecommunications America, L.P., 2005.

(Continued)

*Primary Examiner* — Quan M Hua
(74) *Attorney, Agent, or Firm* — Ridout & Maybee LLP

(57) ABSTRACT

To provide a consistent (i.e., single-mode) user interface in each mode of operation available on a multi-mode mobile terminal, aspects of the user interface used for a second mode (e.g., the CDMA mode) are emulated by the mobile terminal when the mobile terminal is operating in a first mode (e.g., the GSM mode). Responsive to receiving, while operating in a first mode, an indication of a given user interface interaction, the multi-mode mobile terminal determines the call state. Based on the given user interface interaction and the call state, the multi-mode mobile terminal selects a candidate message corresponding to operation of the multi-mode mobile terminal in a second mode. The multi-mode mobile terminal then converts the candidate message to one or more first-mode messages and transmits the one or more first-mode messages to the MSC at the second wireless network subsystem.

19 Claims, 5 Drawing Sheets

(56) References Cited

OTHER PUBLICATIONS

Verizon Wireless, CNET's Quick Guide: World phones, CNET Reviews, CNET Networks, Inc., 2006.
SCH-A790 Series, All Digital Mobile Phone, User Guide, VerizonA790 ver.2.book, p. 1, Apr. 2, 2004.
A840 CDMA 1X/GSM, Motomanual, Motorola, Inc. 2005.
Wireless CDMA Modems, Multi-Tech Systems, Inc., CDMA Wireless At Commands (PN S000294G).
International Services, Global Phone Service, Verizon Wireless, 2006.
GSM Network Feature Codes, Access Communications Pty Ltd. 2006, ABN 62 002 111 659.
BenQ M22A GSM / GPRS Wireless Module, AT Command List, BenQ Corporation, 2004.
Korean Intellectual Property Office, Notice Requesting Submission of Opinion, regarding patent application No. 10-2008-0024650, dated Nov. 16, 2009.
Canadian Patent Office, "Requisition by the Examiner in Accordance with Subsection 30(2) of the Patent Rules" in respect of Application No. 2,625,941, Nov. 27, 2014.

\* cited by examiner

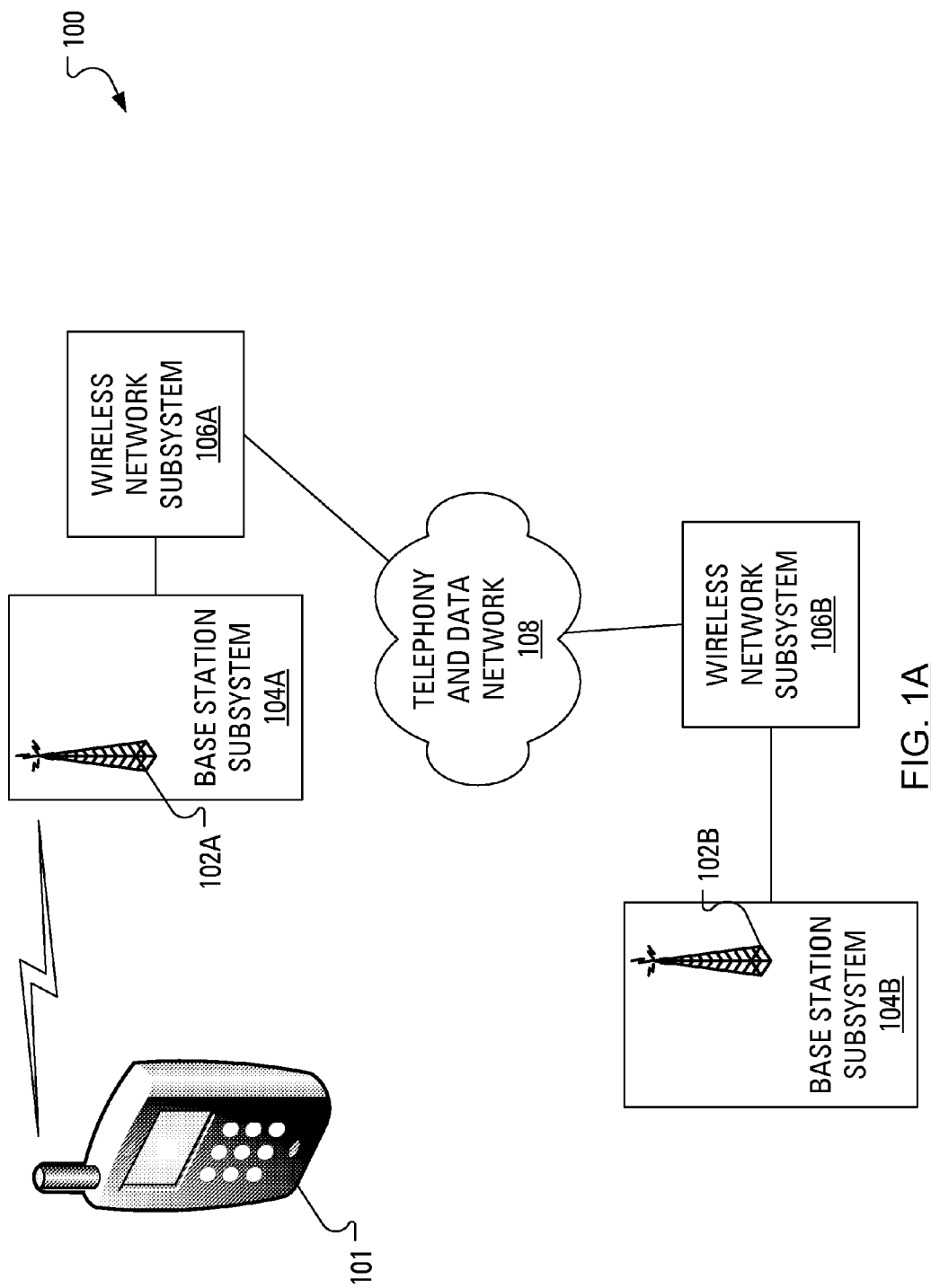

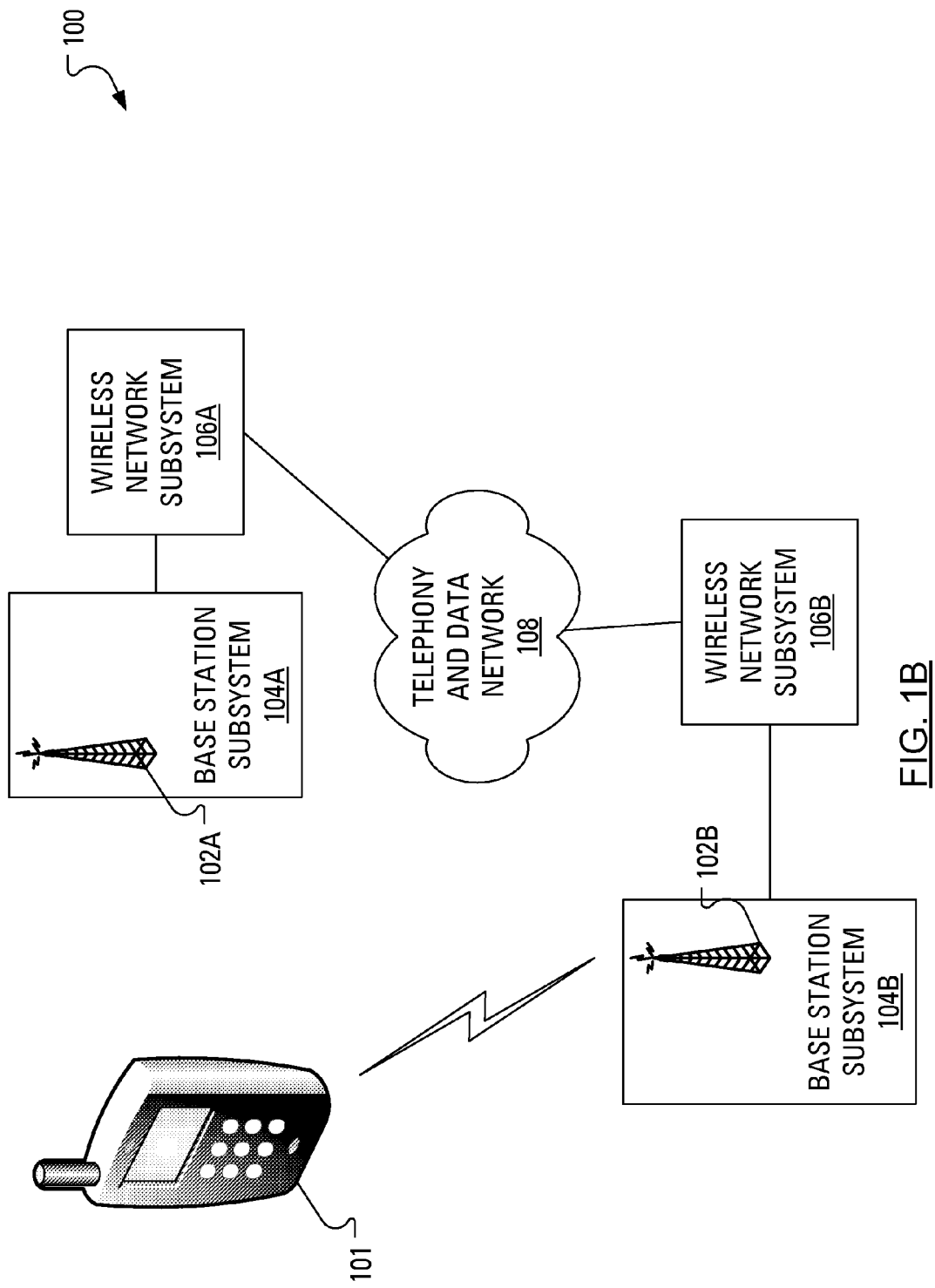

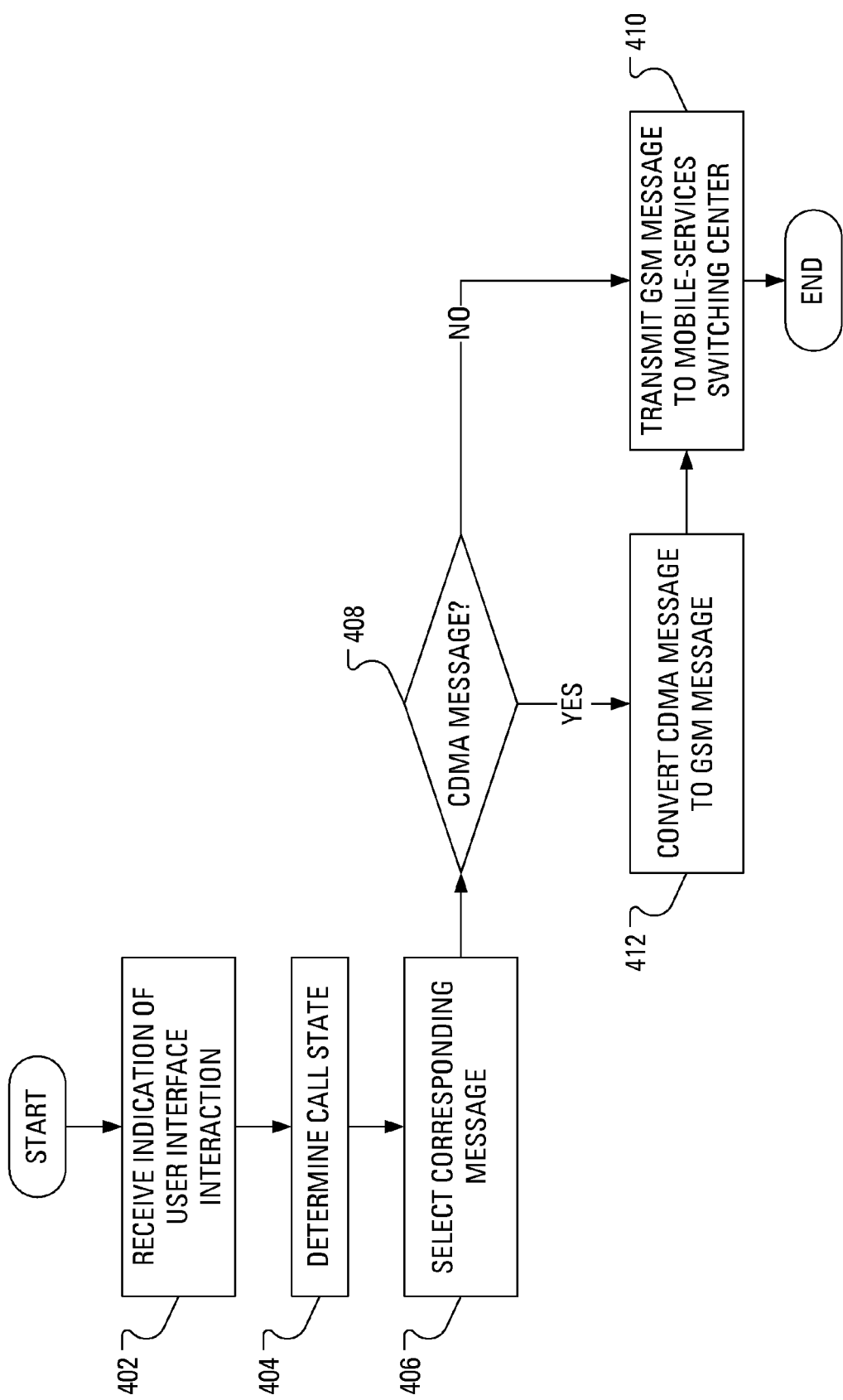

CONSISTENT USER INTERFACE FOR MULTI-MODE MOBILE TERMINALS

FIELD OF THE INVENTION

The present application relates generally to user interfaces for multi-mode mobile terminals and, more specifically, to a consistent user interface for such multi-mode mobile terminals.

BACKGROUND OF THE INVENTION

In the development of mobile telephone standards worldwide, different regions of the world have adopted different standards. As such, a user employing a mobile terminal that is designed to operate on a network using a digital mobile telephony standard called "CDMA" (for Code Division Multiple Access) in the region (e.g., the U.S.A.) of home and work may not be able to receive telephone service on the CDMA mobile terminal while traveling in a region wherein the local networks only use a digital mobile telephony standard called "GSM" (for Global System for Mobile Communications). To address this problem, a few telephone manufacturers have developed dual-mode CDMA/GSM mobile terminals. Advantageously, such dual-mode mobile terminals may be configured to operate in a CDMA mode, for instance, while in the home and work region, and may be reconfigured to operate in a GSM mode, for instance, while traveling in a region serviced by a GSM network.

Given that there are differences between the CDMA mode and the GSM mode, for such activities as accepting a second call using the Call Waiting feature, users of such dual-mode mobile terminals are required to learn how to use the mobile terminal in each of the modes. In the case wherein a user of a dual-mode phone in a CDMA-services region may spend 95% of network time in a CDMA home region and may only travel to a GSM region 5% of the time, the user may be reluctant to take the time to learn how to operate the mobile terminal to take advantage of various features of the GSM network. Accordingly, the user may be frustrated that the mobile terminal acts differently when in the GSM region.

From the perspective of the provider of the home (CDMA) network, it may be regarded as disadvantageous to allow the customer to learn, while roaming in a region served by a GSM network with which the provider has a roaming agreement, that the feature set available in a GSM network is richer than the feature set available in a CDMA network. This may be especially important if the home region of the customer is served by a competitive service provider that operates a GSM network.

BRIEF DESCRIPTION OF THE DRAWINGS

Reference will now be made to the drawings, which show by way of example, embodiments of the invention, and in which:

FIG. 1A illustrates elements of an exemplary network environment for the operation of a multi-mode mobile terminal, with the terminal operating in a first mode;

FIG. 1B illustrates elements of an exemplary network environment for the operation of a multi-mode mobile terminal, with the terminal operating in a second mode;

FIG. 4 illustrates steps of an exemplary method of emulating a first-mode interface while in a second mode according to an aspect of the present application.

DETAILED DESCRIPTION OF THE EMBODIMENTS

Figure 2:
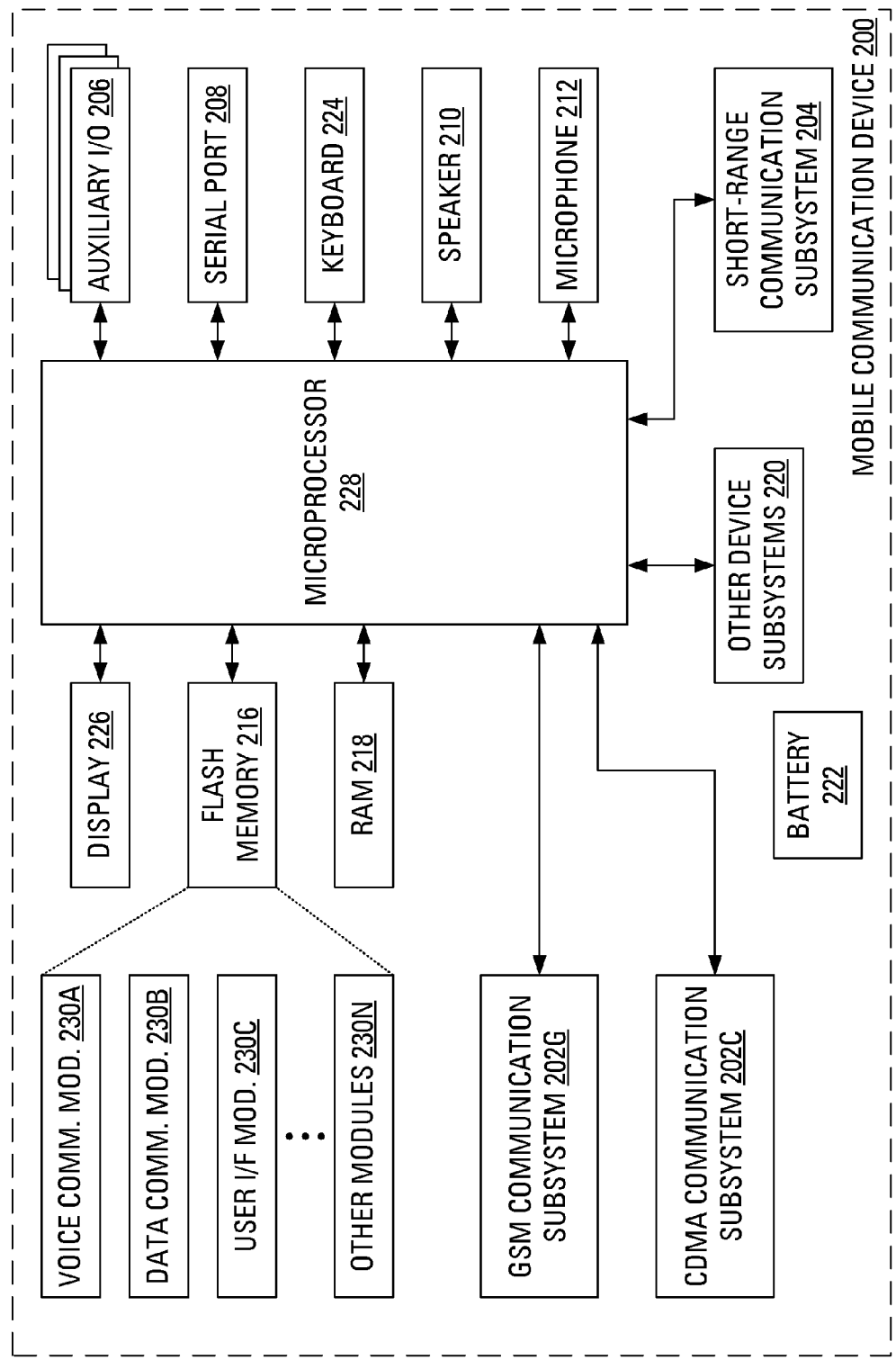
FIG. 2 schematically illustrates the multi-mode mobile terminal of FIGS. 1A and 1B according to an embodiment of the application, the multi-mode mobile terminal having a CDMA communication subsystem and a GSM communication subsystem.

A consistent user interface allows a multi-mode mobile terminal to appear to function as if in a second mode, while the mobile terminal is operating in a first mode. Responsive to receiving, while operating in a first mode, an indication of a given user interface interaction, the multi-mode mobile terminal determines the call state. Based on the given user interface interaction and the call state, the multi-mode mobile terminal selects a candidate message corresponding to operation of the multi-mode mobile terminal in a second mode. The multi-mode mobile terminal then converts the candidate message to one or more first-mode messages and transmits the one or more first-mode messages to the MSC at the second wireless network subsystem.

According to an aspect of the present application, there is provided a method of providing a consistent user interface at a multi-mode mobile terminal. The method includes, while operating in a first mode, receiving an indication of a given user interface interaction and, responsive to the receiving, determining that the multi-mode terminal is in a first call state. The method further includes selecting a candidate message based on the given user interface interaction and the first call state, where the candidate message corresponds to operation of the multi-mode mobile terminal in a second mode, converting the candidate message to one or more first-mode messages; and transmitting the one or more first-mode messages to a switching center. Additionally, a multi-mode terminal is provided for carrying out this method and a computer readable medium is provided for containing instructions to allow a processor in a multi-mode terminal to carry out this method.

Other aspects and features of the present application will become apparent to those of ordinary skill in the art upon review of the following description of specific embodiments of the application in conjunction with the accompanying figures.

It once was the case that, while one was using a telephone for a call, one could not receive a second call. The originator of the attempted second call would receive a "busy signal" indicating that the telephone at the intended destination of the attempted second call is engaged and, accordingly, unavailable to accept the attempted second call.

With the advent of electronic telephone exchanges and computerization during the 1970s and 1980s, new network services became available. Among the new network services were services known as "call waiting" and "three-way calling". As implemented in the telephone service of the day, "call waiting" and "three-way calling" relied upon a simple action by a telephone user. That simple action being a quick depression of a hook switch on the telephone. The hook switch of a telephone is a mechanical switch, the state of which is used to indicate to a telephone network that a telephone line is available to receive a call ("on hook") or is unavailable to receive a call ("off hook"). The act of quickly depressing and releasing the hook switch was given the term "flashing" the telephone line.

During a first telephone call, a called party may receive an audio indication of an incoming second call. To answer the second call using the Call Waiting network feature, the called party merely flashes the line and the network effectively places the first call into an On Hold state and connects the second call to the telephone line of the called party. To reconnect to the first call and place the second call On Hold, the called party may flash the line once again.

In the development of the digital mobile telephony standard called CDMA, the flash concept was maintained for many network features, including the Call Waiting network feature. Rather than a hook switch, however, mobile phones typically have a "SEND", or "TALK", key and an "END" key to establish and release a communication channel with a mobile telephone network base station, respectively. Accordingly, the CDMA standard was designed to handle a depression of the SEND key as generating a flash signal. As such, while engaged in a CDMA telephone call, a called party may receive an indication that the network is prepared to connect a second call to the mobile terminal of the called party. Responsive to receiving an indication that the called party has depressed the SEND key, the network places the first call On Hold and connects the second call to the mobile terminal. The called party may then toggle between the first call and the second call by depressing the SEND key.

In another application, a calling party may use a CDMA mobile terminal keypad to indicate the destination number for a first party in an intended three-way conference call and press the SEND key. Once connected to the first party, the calling party may indicate the destination number for a second party in the three-way conference call and press the SEND key (flash with digits). This press of the SEND key places the first party On Hold and initiates a call to the second party. Once a connected to the second party has been established, the calling party may depress the SEND key (flash) to establish a three-way call between all three parties.

In contrast to the options available during a CDMA call, a richer set of options are available to a user in a network that uses the digital mobile telephony standard called GSM. In particular, while engaged in a first call on a GSM mobile terminal, a user may be informed of an incoming second call. The display of the GSM mobile terminal may provide a user interface allowing the user to select between options to "Accept" the second call, "Reject" the second call or "Ignore" the second call. The user may indicate a selection from among the choices depressing a "soft key", where a soft key is a key on the device that can be mapped to different actions. The mapping is typically dependent upon an application and a displayed user interface screen in the application. Additionally, conference calls may be established among more than three parties, and a conference call arranger, using a GSM mobile terminal, may place the conference call On Hold in favor of a private call with one of the participants. Typically, the actions taken by the user to signal a network to answer a second call or to establish a conference call are different for a CDMA mobile terminal than for a GSM mobile terminal. That is, the user interface is different for the different standards.

FIG. 1A illustrates elements of an exemplary network environment 100 for the operation of a multi-mode mobile terminal 101 in a first mode. The same elements of the exemplary network environment 100 are presented in FIG. 1B for the operation of the multi-mode mobile terminal 101 in a second mode. The elements of the exemplary network environment 100 include multiple wireless carrier networks and a telephony and data communication network 108, which may be considered to represent at least one wide area network, such as the present day Internet and successor networks, as well as, potentially, multiple local area networks and a public switched telephone network. A first base station antenna 102A, with which the multi-mode mobile terminal 101 may communicate wirelessly, is provided as part of a first base station subsystem 104A.

The first base station subsystem 104A connects to a first wireless network subsystem 106A. The first wireless network subsystem 106A, which may include, in part, a Mobile-services Switching Center (MSC), is connected to the telephony and data communication network 108.

Also connected to the telephony and data communication network 108 is a second wireless network subsystem 106B, which may include, in part, an MSC. The second wireless network subsystem 106B operates according to a digital mobile telephony standard distinct from the digital mobile telephony standard according to which the first wireless network subsystem 106A operates. The second wireless network subsystem 106A connects to a second base station subsystem 104B with a second base station antenna 102B. The second base station antenna 102B may allow the second base station subsystem 104B to communicate wirelessly with the multi-mode mobile terminal 101 when the mode of operation of the multi-mode mobile terminal 101 has been switched to match the mode of operation of the second base station subsystem 104B as illustrated in FIG. 1B.

FIG. 2 illustrates the multi-mode mobile terminal 101 including a housing, an input device (a keyboard 224), and an output device (a display 226), which is preferably a full graphic or full color Liquid Crystal Display (LCD). Other types of output devices may alternatively be utilized. A processing device (a microprocessor 228) is shown schematically in FIG. 2 as coupled between the keyboard 224 and the display 226. The microprocessor 228 controls the operation of the display 226, as well as the overall operation of the multi-mode mobile terminal 101, in response to actuation of keys on the keyboard 224 by a user.

The housing may be elongated vertically, or may take on other sizes and shapes (including clamshell housing structures). The keyboard may include a mode selection key, or other hardware or software, for switching between text entry and telephony entry.

In addition to the microprocessor 228, other parts of the multi-mode mobile terminal 101 are shown schematically in FIG. 2. These include: a CDMA communications subsystem 202C; a GSM communications subsystem 202G; a short-range communications subsystem 204; the keyboard 224 and the display 226, along with other input/output devices including a set of auxiliary I/O devices 206, a serial port 208, a speaker 211 and a microphone 212; as well as memory devices including a flash memory 216 and a Random Access Memory (RAM) 218; and various other device subsystems 220. The multi-mode mobile terminal 101 may have a battery 222 to power the active elements of the multi-mode mobile terminal 101. The multi-mode mobile terminal 101 is preferably a two-way radio frequency (RF) communication device having voice and data communication capabilities. In addition, the multi-mode mobile terminal 101 preferably has the capability to communicate with other computer systems via the Internet.

Operating system software executed by the microprocessor 228 is preferably stored in a computer readable medium, such as the flash memory 216, but may be stored in other types of memory devices, such as a read only memory (ROM) or similar storage element. In addition, system software, specific device applications, or parts thereof, may be temporarily loaded into a volatile store, such as the RAM 218. Communication signals received by the mobile device may also be stored to the RAM 218.

The microprocessor 228, in addition to its operating system functions, enables execution of software applications on the multi-mode mobile terminal 101. A predetermined set of software applications that control basic device operations, such as a voice communications module 230A and a data communications module 230B, may be installed on the multi-mode mobile terminal 101 during manufacture. A multi-mode user interface module 230C may also be installed on the multi-mode mobile terminal 101 during manufacture, to implement aspects of the application. As well, additional software modules, illustrated as an other software module 230N, which may be, for instance, a personal information manager (PIM) application, may be installed during manufacture. The PIM application is preferably capable of organizing and managing data items, such as e-mail messages, calendar events, voice mail messages, appointments, and task items. The PIM application is also preferably capable of sending and receiving data items via a wireless carrier network. Preferably, the data items managed by the PIM application are seamlessly integrated, synchronized and updated via the wireless carrier network with the device user's corresponding data items stored or associated with a host computer system.

Communication functions, including data and voice communications, may be performed through the CDMA communication subsystem 202C, the GSM communication subsystem 202G and, possibly, through the short-range communications subsystem 204.

Figure 3:
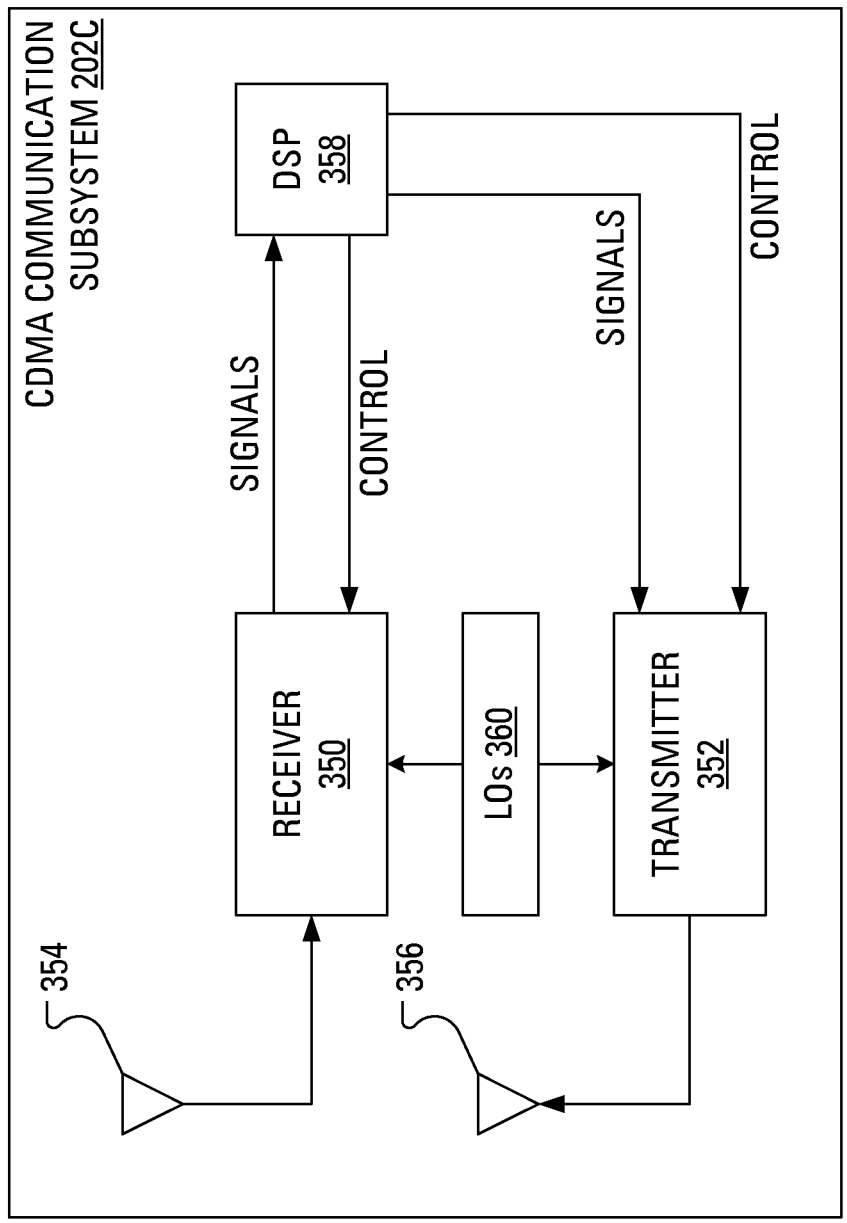
FIG. 3 schematically illustrates the CDMA communication subsystem of FIG. 2, according to an embodiment of the application.

As illustrated in FIG. 3, the CDMA communication subsystem 202C, exemplary of both communication subsystems 202C, 202G, includes a receiver 350, a transmitter 352 and one or more antennas, illustrated as a receive antenna 354 a transmit antenna 356. In addition, the CDMA communication subsystem 202C also includes a processing module, such as a digital signal processor (DSP) 358, and local oscillators (LOs) 360. The specific design and implementation of similar communication subsystems is dependent upon the communication network in which the multi-mode mobile terminal 101 is intended to operate. For example, an exemplary communication subsystem may be designed to operate with the Mobitex™, DataTAC™ or General Packet Radio Service (GPRS) mobile data communication networks and may also be designed to operate with any of a variety of voice communication networks, such as Advanced Mobile Phone Service (AMPS), Time Division Multiple Access (TDMA), CDMA, Personal Communications Service (PCS), GSM, etc. Other types of data and voice networks, both separate and integrated, may also be utilized with the multi-mode mobile terminal 101.

When required network registration or activation procedures have been completed, the multi-mode mobile terminal 101 may send and receive communication signals over the wireless carrier network. When the multi-mode mobile terminal 101 is operating in the CDMA mode associated with the first base station antenna 102A, signals received from the first base station antenna 102A by the receive antenna 354 are routed to the receiver 350, which provides for signal amplification, frequency down conversion, filtering, channel selection, etc., and may also provide analog to digital conversion. Analog-to-digital conversion of the received signal allows the DSP 358 to perform more complex communication functions, such as demodulation and decoding. In a similar manner, signals to be transmitted to the base station antenna 102A are processed (e.g., modulated and encoded) by the DSP 358 and are then provided to the transmitter 352 for digital to analog conversion, frequency up conversion, filtering, amplification and transmission to the first base station antenna 102A via the transmit antenna 356.

In addition to processing communication signals, the DSP 358 provides for control of the receiver 350 and the transmitter 352. For example, gains applied to communication signals in the receiver 350 and the transmitter 352 may be adaptively controlled through automatic gain control algorithms implemented in the DSP 358.

In a data communication mode, a received signal, such as an SMS message or web page download, is processed by the CDMA communication subsystem 202C and is input to the microprocessor 228. The received signal is then further processed by the microprocessor 228 in preparation for output to the display 226, or alternatively to some other auxiliary I/O devices 206. A device user may also compose data items, such as e-mail messages or SMS messages, using the keyboard 224 and/or some other auxiliary I/O device 206, such as a touch-pad, a rocker switch, a thumb-wheel, or some other type of input device. The composed data items may then be transmitted to the base station antenna 102A via the CDMA communication subsystem 202C.

In a voice communication mode, overall operation of the device is substantially similar to the data communication mode, except that received signals may be output to the speaker 211, and signals for transmission may be generated by the microphone 212. Alternative voice or audio I/O subsystems, such as a voice message recording subsystem, may also be implemented on the multi-mode mobile terminal 101. In addition, the display 226 may also be utilized in voice communication mode, for example, to display the identity of a calling party, the duration of a voice call, or other voice call related information.

The short-range communications subsystem 204 enables communication between the multi-mode mobile terminal 101 and other proximate systems or devices, which need not necessarily be similar devices. For example, the short-range communications subsystem 204 may include an infrared device and associated circuits and components, or a Bluetooth™ communication module, to provide for communication with similarly-enabled systems and devices.

In overview, to provide a consistent (i.e., single-mode) user interface in each mode of operation available on a multi-mode mobile terminal, aspects of the user interface used for a second mode (e.g., the CDMA mode) are emulated by the mobile terminal when the mobile terminal is operating in a first mode (e.g., the GSM mode).

Before considering how to implement such an emulation, it is useful to consider that which is to be emulated. Simplified, that which is to be emulated relates to receipt, by the microprocessor 228, of an indication of user interaction with the user interface of the multi-mode mobile terminal 101 and, based on the interaction, arrangement, by the microprocessor 228, of the transmission of a message to a mobile-service switching center. The nature of the message and the result of the transmission of the message to the mobile-service switching center is expected to be dependent upon the "call state" of the multi-mode mobile terminal 101.

In operation, responsive to receiving, while operating in a first mode, an indication of a given user interface interaction, the multi-mode mobile terminal determines the call state. Based on the given user interface interaction and the call state, the multi-mode mobile terminal selects a candidate message corresponding to operation of the multi-mode mobile terminal 101 in a second mode. The multi-mode mobile terminal then converts the candidate message to one or more first-mode messages and transmits the one or more first-mode messages to the MSC at the second wireless network subsystem 106B.

Consider now a CDMA-mode Call Waiting scenario involving a user "A", a user "B" and a user "C". As the scenario begins, user A is connected to user B in an Active call making use of a wireless communications channel between the multi-mode mobile terminal 101 and the first base station subsystem 104A. User C then calls user A. User A receives an indication of the incoming call from user C. The indication may take the form of a change in a user interface provided on the display 226 of the multi-mode mobile terminal 101. Alternatively or additionally, the indication may take the form of a Call Waiting Tone provided on the speaker 210 of the multi-mode mobile terminal 101.

User A may passively ignore the Call Waiting indication or may interact with the multi-mode mobile terminal 101 to answer the call from user C. In the former (ignore) case, nothing is transmitted from the multi-mode mobile terminal 101 to the MSC at the first wireless network subsystem 106A. In the latter (answer) case, the microprocessor 228 of the multi-mode mobile terminal 101 receives an indication of a user interface interaction, determines that the multi-mode mobile terminal 101 is in a "one call Active, one call Waiting" call state and invokes a Flash operation, thereby arranging for the transmission of a Flash CDMA Message to the MSC at the first wireless network subsystem 106A.

The interaction of user A with the multi-mode mobile terminal 101 to answer the call from user C may involve user A pressing a key on the keyboard 224, e.g., the SEND key, or an "ANSWER" key. Alternatively, where the user interface provided on the display 226 of the multi-mode mobile terminal 101 provides an association between the word "Flash" and a soft key, the interaction of user A with the multi-mode mobile terminal 101 to answer the call from user C may involve user A pressing the soft key. Further alternatively, the interaction of user A with the multi-mode mobile terminal 101 to answer the call from user C may involve user A interacting with an auxiliary I/O device 206, such as a touchpad, a rocker switch, a thumb-wheel, or some other type of input device, to cause a menu to appear on the display 226. Subsequently, user A may employ an input device to select a menu item from the menu presented on the display 226 of the multi-mode mobile terminal 101.

Responsive to receiving the Flash CDMA Message, the MSC at the first wireless network subsystem 106A places the call between user A and user B On Hold and connects, i.e., makes "Active", a call between user A and user C.

Once user A is connected in a call with user C and user B is On Hold, user A can toggle to reconnect with user B and have user C placed On Hold. To accomplish such toggling, user A may press the SEND key or the soft key associated with the word "Flash" in the user interface. Responsive to such user interaction, the microprocessor 228 receives an indication of a user interface interaction, determines that the multi-mode mobile terminal 101 is in a "one call Active, one call On Hold" call state and invokes a Flash operation and, thereby, arranges for the transmission of a Flash CDMA Message to the MSC at the first wireless network subsystem 106A.

Responsive to receiving the Flash CDMA Message, the MSC at the first wireless network subsystem 106A places the call between user A and user C On Hold and reconnects, i.e., makes Active, the call between user A and user B.

In a GSM-mode Call Waiting scenario involving the same three users and user A connected to user B in an Active call making use of a wireless communications channel between the multi-mode mobile terminal 101 and the second base station subsystem 104B, user C calls user A. User A receives an indication of the incoming call from user C. The indication may take the form of a change in a user interface provided on the display 226 of the multi-mode mobile terminal 101. Alternatively or additionally, the indication may take the form of a Call Waiting Tone provided on the speaker 210 of the multi-mode mobile terminal 101.

User A may passively ignore the Call Waiting indication or may interact with the multi-mode mobile terminal 101 to answer the call from user C. According to section 4.5.5.2 of the $3^{rd}$ Generation Partnership Project (3GPP™) Technical Specification Group Services and System Aspects; Man-Machine Interface (MMI) of the Mobile Station (MS); Service description, Stage 1 (Release 1998) standard TS 02.30 V7.1.1, available from www.3gpp.org, to place On Hold the current call and accept (answer) the waiting call, user A presses the 2 key followed by the SEND key, within a preset time-out period. Similarly, to end the current call and accept the waiting call, user A presses the 1 key followed by the SEND key, within a preset time-out period. To actively ignore the waiting call, user A presses the 0 key followed by the SEND key, within a preset time-out period.

In the answer case, the microprocessor 228 of the multi-mode mobile terminal 101 receives an indication of a user interface interaction, determines that the multi-mode mobile terminal 101 is in a "one call Active, one call Waiting" call state and arranges for the transmission of a "2, SEND" Message to the MSC at the second wireless network subsystem 106B.

The interaction of user A with the multi-mode mobile terminal 101 to answer the call from user C may involve user A pressing a key on the keyboard 224, e.g., the SEND key or the ANSWER key. Alternatively, where the user interface provided on the display 226 of the multi-mode mobile terminal 101 provides a dialog including a button with the phrase "Answer—place Active call On Hold", the interaction of user A with the multi-mode mobile terminal 101 to answer the call from user C may involve user A indicating selection of the button.

Responsive to receiving the "2, SEND" Message, the MSC at the second wireless network subsystem 106B places the call between user A and user B On Hold and connects, i.e., makes Active, a call between user A and user C.

Once user A is connected to, i.e., in a call with, user C and user B is On Hold, user A can toggle to reconnect to user B and have user C placed On Hold. To accomplish such toggling, user A presses the 2 key followed by the SEND key. Responsive to such user interaction, the microprocessor 228 receives an indication of a user interface interaction, determines that the multi-mode mobile terminal 101 is in a "one call Active, one call On Hold" call state and arranges for the transmission of a "2, SEND" Message to the MSC at the second wireless network subsystem 106B.

Responsive to receiving the "2, SEND" Message, the MSC at the second wireless network subsystem 106B places the call between user A and user C On Hold and reconnects, i.e., makes Active, the call between user A and user B.

To emulate, in the specific Call Waiting example, the CDMA user interface when the multi-mode mobile terminal 101 is operating in the GSM mode, the microprocessor 228 receives an indication of a given user interface interaction, such as, for example, a press on the SEND key or the soft key associated with the word "Flash" in the user interface. Responsive to such user interaction, the microprocessor 228 determines that the multi-mode mobile terminal 101 is in a "call with user B Active, call from user C Waiting" call state and invokes the Flash operation. However, rather than arranging for the transmission of a Flash CDMA Message, the invocation of the Flash operation results in the transmission of a "2, SEND" Message to the MSC at the second wireless network subsystem 106B.

Responsive to receiving the "2, SEND" Message, the MSC at the second wireless network subsystem 106B places the call between user A and user B On Hold and connects, i.e., makes Active, a call between user A and user C.

To emulate, in the call toggling example, the CDMA user interface when the multi-mode mobile terminal 101 is operating in the GSM mode, the microprocessor 228 receives an indication of a given user interface interaction, such as, for example, a press on the SEND key or the soft key associated with the word "Flash" in the user interface. Responsive to such user interaction, the microprocessor 228 determines that the multi-mode mobile terminal 101 is in a "call with user C Active, call with user B On Hold" call state and invokes the Flash operation. However, rather than arranging for the transmission of a Flash CDMA Message, an invocation of the Flash operation results in the transmission of a "2, SEND" Message to the MSC at the second wireless network subsystem 106B.

Responsive to receiving the "2, SEND" Message, the MSC at the second wireless network subsystem 106B places the call between user A and user C On Hold and reconnects, i.e., makes Active, the call between user A and user B.

Consider now a CDMA-mode Multi Party Call establishment scenario involving user A, user B and user C. As the scenario begins, user A is connected to user B in an Active call. User A wants user C to join the call with user B, thereby establishing a Multi Party Call.

In the CDMA mode, user A can establish a Multi Party Call with user B and user C by first pressing the SEND key or the soft key associated with the word "Flash" in the user interface, then entering the destination number of user C, then pressing the SEND key, waiting for the call to user C to be established and then again pressing the SEND key or the soft key associated with the word "Flash" in the user interface. The first press of the SEND key results in an invocation of the Flash operation and, subsequently, the transmission of a first Flash CDMA Message to the MSC at the first wireless network subsystem 106A. Where the destination number of user C has been entered before the second pressing of the SEND key, the Flash operation arranges the transmission of a "Flash plus Info" CDMA Message to the MSC at the first wireless network subsystem 106A. The last press of the SEND key results in an invocation of the Flash operation and, subsequently, the transmission of a second Flash CDMA Message to the MSC at the first wireless network subsystem 106A.

Responsive to receiving the first Flash CDMA Message, the MSC at the first wireless network subsystem 106A places the call between user A and user B On Hold. Responsive to receiving the Flash plus Info CDMA Message, the MSC at the first wireless network subsystem 106A establishes a call between user A and user C. Responsive to receiving the second Flash CDMA Message, the MSC at the first wireless network subsystem 106A joins the On Hold call between user A and user B to the Active call between user A and user C, thereby establishing a Multi Party Call between user A, user B and user C.

In the GSM mode, user A can establish a Multi Party Call with user B and user C by entering the destination number of user C, pressing the SEND key, waiting for the call to user C to be established, pressing the 3 key and then again pressing the SEND key. The first press of the SEND key results transmission of a "destination number plus SEND" Message to the MSC at the second wireless network subsystem 106B. The last press of the SEND key results in the transmission of a "3, SEND" Message to the MSC at the second wireless network subsystem 106B.

Responsive to receiving the "destination number plus SEND" Message, the MSC at the second wireless network subsystem 106B first places the call between user A and user B On Hold and then establishes a call between user A and user C. Responsive to receiving the "3, SEND" Message, the MSC at the second wireless network subsystem 106B joins the On Hold call between user A and user B to the Active call between user A and user C, thereby establishing a Multi Party Call between user A, user B and user C.

To emulate, in the specific Multi Party Call example, the CDMA user interface when the multi-mode mobile terminal 101 is operating in the GSM mode, the microprocessor 228 receives an indication of a given user interface interaction, such as, for example, a press on the SEND key or the soft key associated with the word "Flash" in the user interface, followed by a destination number and a further press on the SEND key. Responsive to such user interaction, the microprocessor 228 determines that the multi-mode mobile terminal 101 is in a "call with user B Active" call state and invokes the Flash operation. However, rather than arranging for the transmission of a Flash CDMA Message and a Flash plus Info CDMA Message, an invocation of the Flash operation results in the transmission of a "destination number plus SEND" Message to the MSC at the second wireless network subsystem 106B. Responsive to an indication of further user interaction in the form of a further SEND key press, the Flash operation arranges for the transmission of the "3, SEND" Message to the MSC at the second wireless network subsystem 106B.

Responsive to receiving the "destination number plus SEND" Message, the MSC at the second wireless network subsystem 106B first places the call between user A and user B On Hold and then establishes a call between user A and user C. Responsive to receiving the "3, SEND" Message, the MSC at the second wireless network subsystem 106B joins the On Hold call between user A and user B to the Active call between user A and user C, thereby establishing a Multi Party Call between user A, user B and user C.

FIG. 4 illustrates steps of an exemplary method of emulating a second-mode interface while in a first mode.

For the sake of the following example, consider that the multi-mode mobile terminal 101 is operating in the GSM mode and will implement aspects of the present application to emulate operation in the CDMA mode. Initially, the microprocessor 228 of the multi-mode mobile terminal 101 receives (step 402) an indication of a given user interface interaction. For example, the indication may carry the information that the user has pressed the SEND key.

Responsive to receiving the indication of the given user interface interaction, the microprocessor 228 determines (step 404) the call state of the multi-mode mobile terminal 101. Exemplary call states include: Idle; Single Party Call Active; Single Party Call Active and Single Party Call Waiting; Single Party Call On Hold; Single Party Call On Hold and Single Party Call Active; Multi Party Call Active; Multi Party Call Active and Single Party Call Waiting.

Based on the multi-mode terminal 101 being in a particular call state, the microprocessor 228 interprets the indication of the given user interface interaction to select (step 406) the corresponding message to send to the MSC. Such selection may be, for instance, table-based. That is, for each call state in each mode, the multi-mode mobile terminal 101 may maintain a table of correspondences between user interface interaction events and messages to be sent to the MSC. Under typical circumstances for a multi-mode mobile terminal, the table consulted to select a message corresponding to a user interface interaction event is associated with the mode in which the multi-mode mobile terminal is operating. However, where the multi-mode mobile terminal is to emulate aspects of the user interface used for a second mode when the mobile terminal is operating in a first mode, a second-mode table associated with the call state should be consulted first. If a message may be selected, corresponding to the given user interface interaction, from the second-mode table, the selection step (step 406) is complete. However, if no correspondence is found in the second-mode table, a message may be selected from the first-mode table associated with the call state.

After selecting (step 406) the message corresponding to the given user interface interaction, the microprocessor 228 determines (step 408) whether the message is a CDMA message (i.e., from the CDMA table) or a GSM message (i.e., from the GSM table). That is, the microprocessor 228 determines whether CDMA message emulation will be necessary.

If the microprocessor 228 determines (step 408) that the message is a GSM message, there is no need for emulation and the microprocessor 228 arranges to transmit (step 410) the GSM message to the MSC.

If the microprocessor 228 determines (step 408) that the message is a CDMA message, the microprocessor 228 converts (step 412) the CDMA message to one or more corresponding GSM messages. Such conversion may involve use of a table associating each possible CDMA message with corresponding GSM messages.

Finally, the microprocessor 228 arranges transmission (step 410) of the GSM messages to the MSC.

The above-described embodiments of the present application are intended to be examples only. Alterations, modifications and variations may be effected to the particular embodiments by those skilled in the art without departing from the scope of the application, which is defined by the claims appended hereto.

What is claimed is:

1. A method of providing a consistent user interface at a multi-mode mobile terminal, said method comprising:
providing a user interface that corresponds to operation of said multi-mode mobile terminal in a second mode;
receiving, while handling a call while operating in a first mode, an indication of an interaction with said user interface;
determining, responsive to said receiving, that said multi-mode terminal is in a first call state;
selecting a candidate message based on said interaction and said first call state, where said candidate message is selected from among a plurality of messages available when said multi-mode mobile terminal is operating in said second mode;
converting said candidate message to one or more first-mode messages; and
transmitting said one or more first-mode messages to a switching center.

2. The method of claim 1 wherein said one or more first-mode messages trigger said switching center to control a transition, at said multi-mode mobile terminal, from said first call state to a second call state, where said transition is associated with receipt of said interaction in said second mode.

3. The method of claim 1 wherein said first mode is a Global System for Mobile Communications mode.

4. The method of claim 2 wherein said second mode is a Code Division Multiple Access mode.

5. The method of claim 1 wherein said interaction is a press on a key.

6. The method of claim 5 wherein said key is a SEND key.

7. The method of claim 5 wherein:
said providing said user interface comprises presenting a visual user interface on a display of said multi-mode mobile terminal; and
said key is a soft key associated with said visual user interface.

8. The method of claim 1 wherein:
said providing said user interface comprises presenting a visual user interface on a display of said multi-mode mobile terminal; and
said interaction is a selection of a menu item in said visual user interface.

9. The method of claim 1 wherein said first call state is one of: a Single Party Call Active state; a Single Party Call Active and Single Party Call Waiting state; a Single Party Call On Hold state; a Single Party Call On Hold and Single Party Call Active state; a Multi Party Call Active state; and a Multi Party Call Active and Single Party Call Waiting state.

10. A multi-mode mobile terminal comprising:
a processor arranged to:
provide a user interface that corresponds to operation of said multi-mode mobile terminal in a second mode;
receive, while handling a call while operating in a first mode, an indication of an interaction with said user interface;
determine, responsive to said receiving, that said multi-mode terminal is in a first call state;
select a candidate message based on said interaction and said first call state, where said candidate message is selected from among a plurality of messages available when said multi-mode mobile terminal is operating in said second mode;
convert said candidate message to one or more first-mode messages; and
a transmitter for transmitting said one or more first-mode messages to a switching center.

11. A tangible computer readable medium containing computer-executable instructions that, when performed by processor, cause said processor to:
provide a user interface that corresponds to operation of said multi-mode mobile terminal in a second mode;
receive, while handling a call while operating in a first mode, an indication of an interaction with said user interface;
determine, responsive to said receiving, that an associated multi-mode terminal is in a first call state;
select a candidate message based on said interaction and said first call state, where said candidate message is selected from among a plurality of messages available when said multi-mode mobile terminal is operating in said second mode;
convert said candidate message to one or more first-mode messages; and
arrange transmission of said one or more first-mode messages to a switching center.

12. The multi-mode mobile terminal of claim 10 wherein said one or more first-mode messages trigger said switching center to control a transition, at said multi-mode mobile terminal, from said first call state to a second call state, where said transition is associated with receipt of said interaction in said second mode.

13. The multi-mode mobile terminal of claim 10 wherein said first mode is a Global System for Mobile Communications mode.

14. The multi-mode mobile terminal of claim 10 wherein said second mode is a Code Division Multiple Access mode.

15. The multi-mode mobile terminal of claim 10 wherein said given user interface interaction is a key press.

16. The tangible computer readable medium of claim 11 wherein said one or more first-mode messages trigger said switching center to control a transition, at said multi-mode mobile terminal, from said first call state to a second call state, where said transition is associated with receipt of said interaction in said second mode.

17. The tangible computer readable medium of claim 11 wherein said first mode is a Global System for Mobile Communications mode.

18. The tangible computer readable medium of claim 11 wherein said second mode is a Code Division Multiple Access mode.

19. The tangible computer readable medium of claim 11 wherein said given user interface interaction is a key press.

* * * * *